United States Patent

Kiel et al.

[11] Patent Number: 5,956,380
[45] Date of Patent: Sep. 21, 1999

[54] METHOD AND APPARATUS FOR DETERMINING NEUTRON FLUX DENSITY, IN PARTICULAR IN A NUCLEAR POWER FACILITY

[75] Inventors: Peter Kiel, Büdingen; Konrad Krien, Erlangen, both of Germany

[73] Assignee: Siemens Aktiengesellschaft, Munich, Germany

[21] Appl. No.: 09/103,169

[22] Filed: Jun. 22, 1998

Related U.S. Application Data

[63] Continuation of application No. PCT/EP96/05656, Dec. 16, 1976.

[30] Foreign Application Priority Data

Dec. 22, 1995 [DE] Germany ............. 195 48 516

[51] Int. Cl.⁶ ................................. G21C 17/108
[52] U.S. Cl. ........................................... 376/254
[58] Field of Search ........................ 376/254, 255, 376/259; 250/388, 392, 390.03, 390.11

[56] References Cited

U.S. PATENT DOCUMENTS

| | | | |
|---|---|---|---|
| 4,623,508 | 11/1986 | Glesius et al. | 376/254 |
| 4,634,568 | 1/1987 | Wimpee et al. | 376/254 |
| 4,637,913 | 1/1987 | Jacquot et al. | 376/254 |
| 4,652,419 | 3/1987 | Fukushima et al. | 376/254 |
| 5,015,434 | 5/1991 | Wimpee et al. | 376/254 |
| 5,225,149 | 7/1993 | Banda | 376/254 |

*Primary Examiner*—Daniel D. Wasil
*Attorney, Agent, or Firm*—Herbert L. Lerner; Laurence A. Greenberg

[57] ABSTRACT

A method and an apparatus are used for determining the neutron flux density of a neutron-emitting source, in particular a reactor core of a nuclear power facility. In the method, a first measurement signal and a second measurement signal, which differ from one another and are each monotonally dependent on the neutron flux density, are used to form a wide-range signal that depends uniquely on the neutron flux density. The wide-range signal is defined region-by-region, the wide-range signal is equated to the first measurement signal in a region where the values of the neutron flux density $n$ are lower, $n<n_1$, is equated to the second measurement signal in a region where the values of the neutron flux density are higher, $n>n_2$, and is equated to a monotonal function of both measurement signals in an overlapping region located in between.

13 Claims, 2 Drawing Sheets

METHOD AND APPARATUS FOR DETERMINING NEUTRON FLUX DENSITY, IN PARTICULAR IN A NUCLEAR POWER FACILITY

CROSS-REFERENCE TO RELATED APPLICATION

This application is a continuation of International Application No. PCT/EP96/05656, filed Dec. 16, 1996, which designated the United States.

BACKGROUND OF THE INVENTION

FIELD OF THE INVENTION

The invention relates to a method and an apparatus for determining the neutron flux density of a neutron-emitting source, in particular a reactor core in a nuclear power facility, having a plurality of fuel assemblies.

An apparatus for determining neutron flux density, a so-called neutron measurement system, is often used in a nuclear power facility to monitor start-up and shut-down procedures. The neutron measurement system has neutron detectors which, in particular, supply a signal proportional to the neutron flux density.

The neutron flux density, when a nuclear power facility is in the shut-down, sub-critical state, differs by several orders of magnitude from that when the nuclear power facility is producing power.

A book entitled "Strahlung und Strahlungsmeßtechnik in Kernkraftwerken" [Radiation and Radiation Metrology in Nuclear Power Facilities], published by Elmar Schrüfer, Elitera Verlag, Berlin, 1974 deals comprehensively with the construction and method of operation of neutron detectors, particularly in Sections 3.4, 6.1 and 6.2 thereof. As described in Section 6.1, neutron flux measurement systems with neutron detectors are used to determine the reactor power of a nuclear power facility. In that case a neutron detector may be disposed both outside and inside the reactor core, between adjacent fuel assemblies or elements. The neutron detector may be configured in such a way that it can be moved along a major axis. It can thus be removed from the reactor core during regular power operation of the nuclear power facility.

With regard to the method of operation and measurement accuracy, a distinction is drawn between three different systems for neutron detectors. So-called pulsed systems are preferably used in a boiling water nuclear power facility, where the intention is to achieve high sensitivity in strong gamma radiation. Since in that case low pulse rates can be measured much more easily than very small currents, pulsed systems can also be used to measure lower neutron flux densities. The low gamma pulse level allows discrimination between neutrons and the gamma radiation, for example by using threshold value discriminators. The operating range of a pulsed system covers neutron flux densities in a range from about $10^{-1}$ neutrons/(cm²·s) to about $10^5$ neutrons/(cm²·s). That corresponds to a reactor power level of up to about $10^{-3}$%.

So-called direct-current systems are preferably suitable for medium and high neutron flux levels in a range from about $10^2$ neutrons/(cm²·s) to about $10^9$ neutrons (cm²·s). Discrimination between neutrons and the gamma radiation is preferably carried out using so-called gamma-compensated ionization chambers. At low neutron flux levels, the use of a direct-current system is generally limited by the influence of the gamma radiation. A neutron detector in a direct-current system is preferably based on a fission chamber and/or boron meter, as are described, for example, in Section 3.4 of the above-mentioned book.

In the case of the so-called alternating-current system, the alternating current which is produced in a fission chamber, ionization chamber or boron meter is superimposed on the direct current and is used to form information. Due to the high ionization rate of the gas in such a chamber, it is no longer possible to resolve the individual pulses from the ionized gas separately. In consequence, a direct current is produced as a mean value, and an alternating current is superimposed thereon. The mean square value of the alternating-current signal is directly proportional to the neutron flux density, as is the direct current as well. The ratio of the signal from the detected neutrons to the signal caused by gamma radiation in an alternating-current system may be greater by a factor of 1000 than that in a direct-current system. An alternating-current system is thus preferably suitable for the medium and high ranges of reactor power levels, with neutron flux densities between $10^6$ neutrons/(cm²·s) and $10^{14}$ neutrons/(cm²·s). An alternating-current system is thus also suitable for the power range of a nuclear power facility.

SUMMARY OF THE INVENTION

It is accordingly an object of the invention to provide a method and an apparatus for determining neutron flux density, in particular in a nuclear power facility, which overcome the hereinafore-mentioned disadvantages of the heretofore-known methods and apparatuses of this general type, in which the method uses different measurement signals in a simple and reliable manner and over a wide range to determine the neutron flux density, in particular from a shut-down to a normal power range of a nuclear power facility, and in which the apparatus determines the neutron flux density of a source that emits neutrons, in particular in a nuclear power facility.

With the foregoing and other objects in view there is provided, in accordance with the invention, a method for determining the neutron flux density of a neutron-emitting source, which comprises forming a wide-range signal W depending uniquely on a neutron flux density from a first measurement signal $S_1$ and at least one second measurement signal $S_2$ differing from one another and each dependent on the neutron flux density; selecting the first measurement signal $S_1$ as a monotonal function of the neutron flux density for values of the neutron flux density less than a first limit flux density; equating the wide-range signal W to the first measurement signal $S_1$ in accordance with the relationship $W=f_1(S_1)=S_1$ for values of the first measurement signal $S_1$ corresponding to a neutron flux density less than a lower limit value which is less than the first limit flux density and to which a first signal value $N_1$ of the first measurement signal $S_1$ is allocated; forming the wide-range signal W as a function $f_2$ of the measurement signals $S_1$, $S_2$ in accordance with the relationship $W=f_2(S_1, S_2)$ for values of the first measurement signal $S_1$ corresponding to a neutron flux density greater than the lower limit value; making the wide-range signal W continuous at the lower limit value in accordance with the relationship $f_1(N_1)=f_2(N_1, S_2)$; and using the wide-range signal W as a basis for determining the neutron flux density.

Due to the unique dependency of the wide-range measurement signal on the neutron flux density, it is possible, in the case of a nuclear power facility, to determine the power level of the reactor of that nuclear power facility. This applies in particular to a nuclear power facility having a boiling water reactor or a pressurized water reactor. In this case, the lower limit value and the first limit flux density of the neutron flux density are each uniquely allocated a value of the first measurement signal. Therefore, it is also always possible to use the associated value of the first measurement signal, instead of the value of the neutron flux density. The first signal value (allocated to the lower limit value) of the first measurement signal can thus be used as the limit value when carrying out the method until the wide-range signal is formed from the first measurement signal. The wide-range signal is formed as a function of the first measurement signal and of the second measurement signal for values of the first measurement signal which are greater than the first signal value. This function thus depends on the first measurement signal and the second measurement signal such that, if the value of the first measurement signal is equal to that of the first signal value, it just corresponds to the first signal value. This ensures that, irrespective of the choice of the first signal value, that is to say of the lower limit value of the neutron flux density, the wide-range signal is continuous in all cases.

In accordance with another mode of the invention, the second measurement signal is a monotonal function of the neutron flux density for values of the neutron flux density which are greater than a second limit flux density, and the second limit flux density is less than the first limit flux density. An overlapping region is used and is defined between the lower limit value and an upper limit value, with the upper limit value of the neutron flux density being greater than the second limit flux density. This ensures that, in the overlapping region, both the first measurement signal and the second measurement signal are respective monotonal functions of the neutron flux density in an interval defined by the first limit flux density and the second limit flux density. Both measurement signals preferably rise or fall monotonally. This provides a simple way of ensuring the unique dependency of the wide-range signal on the neutron flux density, even in the overlapping region. Due to the monotonal nature of the first measurement signal for neutron flux densities below the first limit flux density, and to the monotonal nature of the second measurement signal for neutron flux densities above the second limit flux density, the overlapping region is also uniquely defined by the first signal value of the first measurement signal and the second signal value of the second measurement signal. Thus, without any knowledge of the neutron flux density, it is possible to use just the values of the first measurement signal and of the second measurement signal to define the regions in which the wide-range signal is equated to the first measurement signal or is formed as a function of the first measurement signal and of the second measurement signal. This is irrespective of whether the first measurement signal and the second measurement signal rise or fall monotonally.

It is self-evident that, in an analogous manner to the determination of the overlapping region, a monotonal wide-range signal allows a further overlapping region to be determined as a function of the first measurement signal and of the second measurement signal. In such a further overlapping region, which may be adjacent the first-mentioned overlapping region for smaller or larger values of the neutron flux density, the wide-range signal may be composed of a third measurement signal and the first or the second measurement signal, to provide a continuous transition for the wide-range signal at the region boundaries of the further overlapping region, in an analogous manner to the first-mentioned overlapping region.

The method is particularly advantageous above all in nuclear power facilities in which the wide-range signal is also fed into the safety system of the nuclear power facility, since the safety system may include a rapid or unexpected change in the neutron flux density or the reactor power as a triggering criterion for scramming the nuclear power facility, and both of these parameters can be identified by the wide-range signal. Any discontinuity in the wide-range signal could, under some circumstances, lead to unjustified scramming of the nuclear power facility. In such a case, that is avoided from the start by the method as a consequence of the specified determination of the wide-range signal.

In accordance with a further mode of the invention, the wide-range signal is equated to the second measurement signal for values of the second measurement signal to which a neutron flux density greater than the upper limit value is allocated. The wide-range signal is thus a function which is defined region-by-region and is defined differently in three respectively directly mutually adjacent regions. It is only in the overlapping region that there is a function of both the first measurement signal and the second measurement signal, with a continuous transition being ensured at the region boundaries of the overlapping region.

As already mentioned, the wide-range signal may also be defined differently in four or more regions, although it is intended that the transition of the wide-range signal be continuous at each region boundary and that the wide-range signal should be monotonal within each region.

These continuous transitions are preferably ensured by a function which, as a result of the fact that it is composed of the first measurement signal and the second measurement signal, coincides with the first measurement signal at the lower limit value, and coincides with the second measurement signal at the upper limit value. At the region boundaries and outside the overlapping region, the function is thus always dependent on only a single measurement signal, and precisely on that measurement signal which is a monotonal function of the neutron flux density outside the overlapping region, up to the respective limit value. Within the overlapping region, the function is preferably formed as a sum of the product of the first measurement signal and a factor dependent on the second measurement signal, and the product of the second measurement signal and a factor dependent on the first measurement signal. The factor which is dependent on the second measurement signal is formed in such a way that it assumes the value zero when the second measurement signal corresponds to the second signal value, that is to say at the upper limit value of the neutron flux density of the overlapping region. The factor that is dependent on the first measurement signal is defined in an analogous manner, so that it becomes zero when the first measurement signal assumes the first signal value, that is to say at the lower limit value of the overlapping region. The factor which is dependent on the second measurement signal is preferably the equation of the difference between the second signal value and the second measurement signal and the difference between the second signal value and the first signal value. The factor which is dependent on the first measuring signal is, correspondingly, the equation of the difference between the first measurement signal and the first signal value and the difference between the second signal value and the first signal value.

In accordance with an added mode of the invention, the wide-range signal is a monotonally rising function of the neutron flux density.

In accordance with an additional mode of the invention, this is the situation, for example, where the measurement signals are those from a neutron measurement signal which has an ionization chamber, a fission chamber, a boron meter, a so-called "self powered neutron" detector (SPN detector) or a counting tube, without using any recalculation or conversion.

The first measurement signal and the second measurement signal are preferably produced in an ionization chamber, a fission chamber, a boron meter, an SPN detector or a counting tube, and it is always possible to produce both measurement signals in the same chamber or in the same counting tube. The construction and the method of operation of a neutron detector for producing a measurement signal which is, in particular, proportional to the neutron flux density is described, for example, in German Utility Model G 93 05 956.6 and in the book entitled "Radiation, Detection and Measurement" by Glenn F. Knoll, John Wiley & Sons, New York, $2_{nd}$ Edition, 1985 in particular Chapters 5 and 14. That relates in particular to a neutron detector having a fission chamber or a boron meter, which are of such compact construction that they are suitable for use within a reactor, that is to say for so-called in-core instrumentation.

In accordance with yet another mode of the invention, the first measurement signal is a so-called pulsed signal from an ionization chamber, and the signal is produced by gas atoms or gas molecules ionized by neutrons. A pulsed signal is distinguished by the fact that, particularly in the case of low neutron flux densities of less than $10^5$ neutrons/(cm$^2$·s), it is a particularly good measurement signal which can be clearly distinguished from other types of radioactive radiation, in particular gamma radiation. At low neutron flux densities, the pulsed signal is proportional to the neutron flux density.

The second measurement signal is preferably a direct-current or alternating-current signal from the same ionization chamber. At high neutron flux densities, at which levels individual pulses from the ionized gas atoms or gas molecules can no longer be clearly separated from one another, the current signal is a measurement signal proportional to the neutron flux density. The current signal allows neutron flux densities from about $10^3$ neutrons/(cm$^2$·s) to about $10^{10}$ neutrons/(cm$^2$·s) to be detected reliably.

The current produced in an ionization chamber by the ionized gas atoms or gas molecules contains an alternating-current element, due to the fluctuation in the number of pulses. This alternating-current element is squared and then averaged to obtain an alternating-current signal which is proportional to the neutron flux density.

The alternating-current signal is preferably determined by using the so-called cross-correlation method, in which a signal is picked off both from an internal electrode and from an external electrode of the ionization chamber. These signals are of opposite polarity, but are otherwise identical. They are used for a cross-correlation function, which is proportional to the mean square of the alternating-current element, and thus to the neutron flux density. The cross-correlation method makes it possible to eliminate scatter and statistical disturbances (noise) which are in each case contained in only one of the signals.

The second measurement signal that is formed in this way is directly proportional to the neutron flux density up to a lower neutron flux density of about $10^3$ neutrons/(cm$^2$·s). The maximum neutron flux density which can be measured for the second measurement signal is about $10^{10}$ neutrons/(cm$^2$·s). In this way, particularly in a pressurized water nuclear power facility, the neutron flux density can be reliably detected in a range from $10^{-5}$% to 100% of the reactor power. What has been said above applies analogously to a fission chamber and to a counting tube.

In accordance with yet a further mode of the invention, the method for determining the neutron flux density is used in a nuclear power facility. In this case, the source which emits the neutrons is the reactor core of the nuclear power facility, having a plurality of fuel assemblies. The neutron flux density is determined outside the reactor core and, through the use of the so-called in-core instrumentation, between the fuel assemblies within the reactor core. It is possible to determine the neutron flux density during a starting-up process, a shutting-down process or during normal operation of the nuclear power facility, over the entire power range, by producing the wide-range signal, which is uniquely dependent on the neutron flux density.

Defining the wide-range signal region-by-region in such a manner that, by definition, the wide-range signal changes over continuously at the region boundaries, ensures that the neutron flux density can be detected reliably even in the event of changes within the reactor core, for example in the event of the fuel elements or assemblies burning away, or in the event of changes in the neutron measurement systems, for example as a result of burning away or as a result of material or temperature fatigue.

With the objects of the invention in view there is also provided an apparatus for determining the neutron flux density of a neutron-emitting source, comprising a measurement device for producing and transmitting a first measurement signal $S_1$ and a second measurement signal $S_2$ differing from one another and each dependent on a neutron flux density, the first measurement signal $S_1$ being a monotonal function of the neutron flux density, in particular monotonally rising, for values of the neutron flux density less than a first limit flux density; and an evaluation device to be connected to the measurement device for forming a wide-range signal W depending uniquely on the neutron flux density and used to determine the neutron flux density, wherein the wide-range signal W corresponds to the first measurement signal $S_1$ in accordance with the relationship $W=f_1(S_1)=S_1$ when the first measurement signal $S_1$ assumes values corresponding to a neutron flux density of less than a lower limit value which is less than the first limit flux density and to which a first signal value $N_1$ of the first measurement signal $S_1$ is allocated; the wide-range signal W is a function $f_2$ of the measurement signals $S_1$ and $S_2$ in accordance with the relationship $W=f_2(S_1, S_2)$ when the first measurement signal $S_1$ assumes values corresponding to a neutron flux density greater than the lower limit value; and the wide-range signal W is continuous at the lower limit value in accordance with the relationship $f_1(N_1)=f_2(N_1, S_2)$.

The wide-range signal in this case is identical to the first measurement signal, as long as the first measurement signal is less than or greater than a predetermined first signal value, depending on whether the first measurement signal rises or falls monotonally as a function of the neutron flux density. If the first measurement signal is greater than the first signal value (monotonally rising profile), then the wide-range signal is formed from a function which depends both on the first measurement signal and on the second measurement signal. The function has the characteristic of being identical to the first measurement signal if the latter just assumes the first signal value. This results in a continuous transition of the wide-range signal at the first signal value which is, to be precise, irrespective of the value of the second measurement signal and irrespective of the profile of the second measurement signal as a function of the neutron flux density.

A corresponding situation applies in the event of the first signal value being undershot for the case in which the first measurement signal falls monotonally as a function of the neutron flux density. A corresponding continuity also occurs at a transition at which the wide-range signal is formed by another function composed of one or more, but at least two, measurement signals. In order to determine the neutron flux density, the evaluation device may, for example, be a computer with a computation program, or an electronic circuit.

In addition to a neutron detector, an ionization chamber, a fission chamber, a boron meter, an SPN detector or a counting tube, the measurement device may have corresponding electrical cables as well as operational amplifiers.

Other features which are considered as characteristic for the invention are set forth in the appended claims.

Although the invention is illustrated and described herein as embodied in a method and an apparatus for determining neutron flux density, in particular in a nuclear power facility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
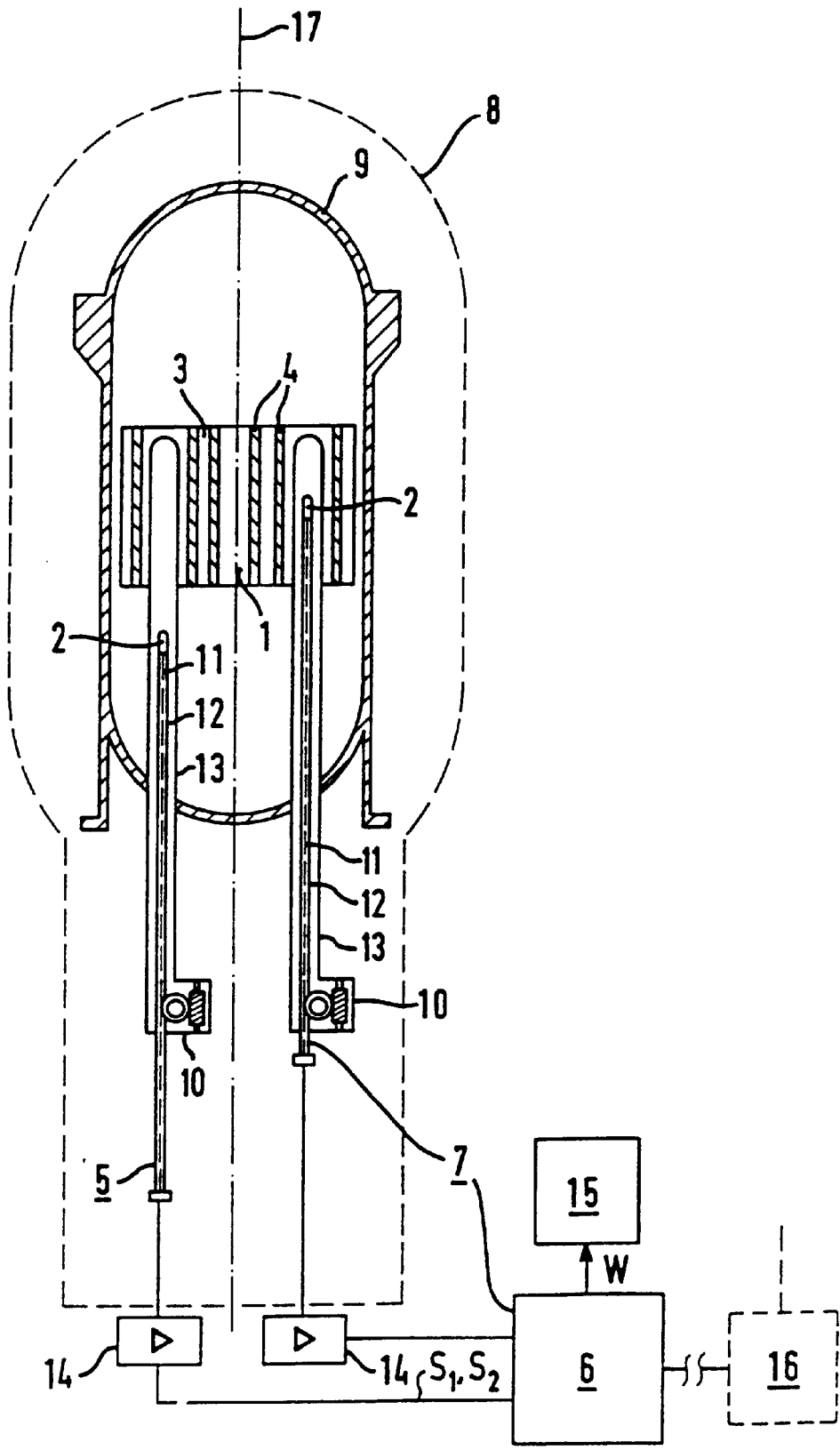
FIG. 1 is a diagrammatic, longitudinal-sectional view of a containment of a boiling water nuclear power facility having an apparatus (which is not illustrated to scale) for determining neutron flux density.

Referring now to the figures of the drawings in detail and first, particularly, to FIG. 1 thereof, there is seen a diagrammatic, longitudinal-sectional view, which is not to scale, of a containment 8 of a boiling water nuclear power facility having an apparatus 7 for determining neutron flux density n. The containment 8 encloses a reactor pressure vessel 9, in which a reactor core 3 is disposed. The containment 8 as well as the reactor pressure vessel 9 are directed along a major axis 17. A plurality of fuel assemblies or elements 4 are disposed in the reactor core 3 and are likewise directed along the major axis 17. The fuel assemblies 4 form a source 1 which emits neutrons as a consequence of nuclear fission.

Measurement lances 13, only two of which are illustrated for reasons of clarity, are provided between a number of mutually adjacent fuel assemblies 4 and are directed parallel to the major axis 17. Each measurement lance 13 has a drive 10 outside the reactor pressure vessel 9 for moving a push rod 12 in the measurement lance 13. An ionization chamber 2, in particular a so-called fission chamber, which forms a neutron detector, is disposed within an end of each push rod 12.

The drive 10 allows the ionization chamber 2 to be moved into the reactor core 3, between the fuel assemblies 4 and, as is particularly important during power operation of the nuclear power facility, the drive 10 allows the ionization chamber 2 to be withdrawn from the reactor core 3 again.

Each ionization chamber 2 is connected through a connecting cable 11, possibly through a plurality of connecting cables 11, to a preamplifier 14 which is disposed outside the containment 8. The ionization chamber 2 as well as the preamplifier 14 are part of a measurement device 5 for producing and transmitting a first measurement signal $S_1$ and a second measurement signal $S_2$, which are used to form a wide-range signal W that is associated uniquely with the neutron flux density n.

Each preamplifier 14 is connected to an evaluation device 6 in which the wide-range signal W is determined. The evaluation device 6 is connected to an output unit 15, in particular for displaying the wide-range signal W, for example on a screen or on a printer. The evaluation device 6 is furthermore connected to a reactor safety system 16 of the nuclear power facility. Neutron flux densities as well as, in particular, major changes in the neutron flux densities which lead to the conclusion that a rapid change has occurred in the reactor power level, can thus be detected through the apparatus 7 and can be input into the reactor safety system 16. The neutron flux density n determined from the wide-range signal W can thus be used as a reliable signal for triggering reactor scramming.

Figure 2:
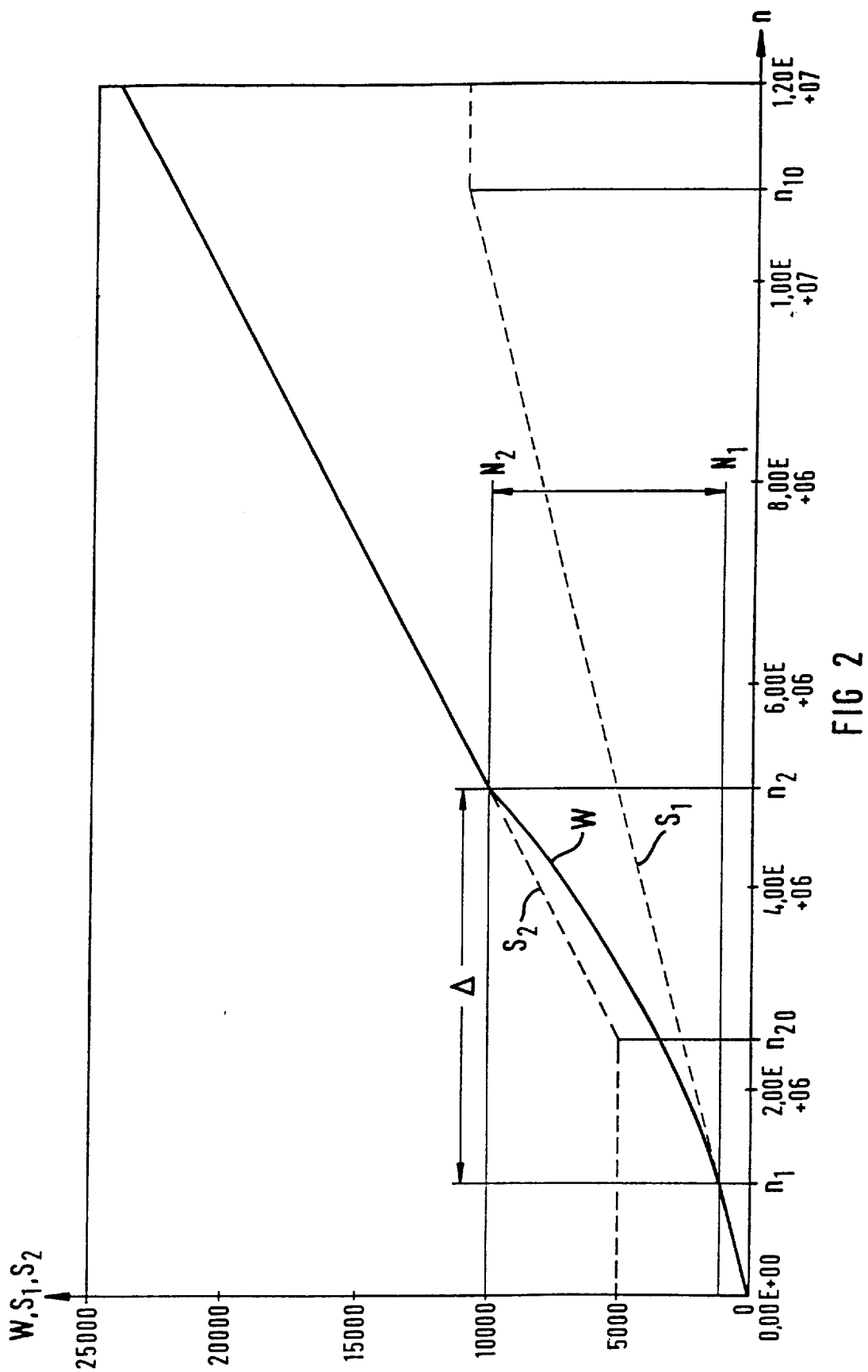
FIG. 2 is a graph showing a profile of a wide-range signal W for determining the neutron flux density n of the boiling water nuclear power facility as a function of the neutron flux density n.

FIG. 2 graphically shows a profile of a wide-range signal W (drawn as a solid line) as a function of the neutron flux density n of a nuclear power facility. The wide-range signal W is a function which is defined region-by-region and has three directly mutually adjacent regions. A first region extends from a neutron flux density n=0 to a neutron flux density $n=n_1$. A second region extends from the neutron flux density $n=n_1$ to a higher neutron flux density $n=n_2$. The second region is followed by a third region. The second region is referred to as an overlapping region Δ. In the overlapping region Δ, the wide-range signal W is a monotonally rising function which is formed from the first measurement signal $S_1$ and the second measurement signal $S_2$. The first measurement signal $S_1$ is a monotonal function of the neutron flux density n from the neutron flux density n=0 to a neutron flux density $n=n_{10}$. The first measurement signal $S_1$ is preferably a pulsed signal from the ionization chamber 2. The second measurement signal $S_2$ is a monotonally rising function of the neutron flux density n in a region of the neutron flux density n which starts at a second limit flux density $n_{20}$.

In the first region, that is to say up to the neutron flux density $n=n_1$, the wide-range signal W is equated to the first measurement signal $S_1$. Since, in practice, the neutron flux density $n=n_1$ is unknown, the opposite procedure is used, namely a first signal value $N_1$, which is uniquely associated with the neutron flux density $n=n_1$, of the first measurement signal $S_1$ is assumed to be the lower limit of the overlapping region Δ. If the first measurement signal $S_1$ is less than or equal to this first signal value $N_1$, then the wide-range signal W is set to be identical to the first measurement signal $S_1$. The wide-range signal W is formed analogously by the second measurement signal $S_2$ for values of the neutron flux density n greater than $n_2$. Since the second measurement signal $S_2$ in this region is likewise a monotonal function of the neutron flux density n, a signal value $N_2$ of the second measurement signal $S_2$ is uniquely allocated to the neutron flux density $n=n_2$. The second signal value $N_2$ is greater than the first signal value $N_1$. The condition that the second measurement signal $S_2$ is greater than the second signal value $N_2$ is accordingly selected as the criterion for equating the wide-range signal W to the second measurement signal $S_2$. The overlapping region Δ defined by the neutron flux densities $n_1$ and $n_2$ is thus uniquely defined by the first signal value $N_1$ and the second signal value $N_2$. The first measurement signal $S_1$ as well as the second measurement signal $S_2$ are both monotonal functions of the neutron flux density n, at least in part of the overlapping region $\Delta$. In this overlapping region $\Delta$, the wide-range signal W is determined both from the first measurement signal $S_1$ and from the second measurement signal $S_2$. More specifically, this is done in such a way that the wide-range signal W is the sum of the product of the first measurement signal $S_1$ and a coefficient factor $\alpha$ dependent on the second measurement signal $S_2$, and the product of the second measurement signal $S_2$ and a coefficient factor $\beta$ dependent on the first measurement signal $S_1$. The coefficient factors $\alpha, \beta$ are chosen in each case in such a way that the wide-range signal W corresponds with the first signal value $N_1$, that is to say with the first measurement signal $S_1$, at the neutron flux density $n_1$, and corresponds with the second signal value $N_2$, that is to say with the second measurement signal $S_2$, at the neutron flux density $n_2$. Furthermore, the coefficient factors $\alpha, \beta$ are chosen in such a way that the wide-range signal W is a monotonal function of the neutron flux density n in the overlapping region $\Delta$. This is achieved, for example, by the coefficient factor $\beta$, which is dependent on the first measurement signal $S_1$, being proportional to the difference between the first signal value $N_1$ and the first measurement signal $S_1$. Analogously, the other coefficient factor $\alpha$ is proportional to the difference between the second measurement signal $S_2$ and the second signal value $N_2$. This choice means that, if the neutron flux density $n=n_1$, then the wide-range signal W merges continuously into the overlapping region $\Delta$, irrespective of the value of the second measurement signal $S_2$. This also applies to the region boundary defined by the neutron flux density $n=n_2$. Even if there is a shift in the start of the proportional dependency of the first measurement signal $S_1$ and of the second measurement signal $S_2$ of the neutron flux density n, for example as a result of the physical conditions in the ionization chamber 2 changing with time, the method ensures that the wide-range signal W is always a unique function of the neutron flux density n.

The invention is distinguished by a method for determining the neutron flux density, particularly in a reactor core of a boiling water or pressurized water nuclear power facility, in which a transition of a wide-range signal in an overlapping region is ensured while maintaining a unique association with the neutron flux density. At low neutron flux densities, the wide-range signal is preferably identical to a pulsed signal from an ionization chamber, and at high neutron flux densities of up to about $10^{14}$ neutrons/(cm$^2 \cdot$s) the wide-range signal is identical to an alternating-current signal from the same ionization chamber. In the overlapping region, the wide-range signal is determined from a combination of the pulsed signal and the alternating-current signal. The combination ensures that the wide-range signal in each case merges continuously into the corresponding measurement signal, the pulsed signal or the alternating-current signal, at the boundaries of the overlapping region. The wide-range signal in the overlapping region is preferably formed by the sum of the product of the pulsed signal and a factor dependent on the alternating-current signal, and of the product of the alternating-current signal and a factor which is dependent on the pulsed signal. The wide-range signal which is formed in this way makes it possible to detect the neutron flux densities in a nuclear power facility from shut-down operation up to power operation at 100% of the rated power of the nuclear power facility. The method is particularly suitable for determining the neutron flux density in the reactor core of a boiling water nuclear power facility.

We claim:

1. A method for determining the neutron flux density of a neutron-emitting source, which comprises:
   a) forming a wide-range signal W depending uniquely on a neutron flux density from a first measurement signal $S_1$ and at least one second measurement signal $S_2$ differing from one another and each dependent on the neutron flux density;
   b) selecting the first measurement signal $S_1$ as a monotonal function of the neutron flux density for values of the neutron flux density less than a first limit flux density;
   c) equating the wide-range signal W to the first measurement signal $S_1$ in accordance with the relationship $W = f_1(S_1) = S_1$ for values of the first measurement signal $S_1$ corresponding to a neutron flux density less than a lower limit value which is less than the first limit flux density and to which a first signal value $N_1$ of the first measurement signal $S_1$ is allocated;
   d) forming the wide-range signal W as a function $f_2$ of the measurement signals $S_1$, $S_2$ in accordance with the relationship $W = f_2(S_1, S_2)$ for values of the first measurement signal $S_1$ corresponding to a neutron flux density greater than the lower limit value;
   e) making the wide-range signal W continuous at the lower limit value in accordance with the relationship $f_1(N_1) = f_2(N_1, S_2)$; and
   f) using the wide-range signal W as a basis for determining the neutron flux density.

2. The method according to claim 1, which comprises:
   a) selecting the second measurement signal $S_2$ as a monotonal function of the neutron flux density, and selecting a second limit flux density to be less than the first limit flux density for values of the neutron flux density greater than the second limit flux density; and
   b) defining an overlapping region with the lower limit value and an upper limit value, the upper limit value greater than the second limit flux density and less than the first limit flux density, and uniquely allocating a second signal value $N_2$ of the second measurement signal $S_2$ to the upper limit value.

3. The method according to claim 2, which comprises forming the function $f_2$ as follows:

$$f_2 = \alpha(S_2) * S_1 + \beta(S_1) * S_2$$

with coefficient factors:

$$\alpha(S_2 = N_2) = 0 \text{ and } \beta(S_1 = N_1) = 0.$$

4. The method according to claim 2, which comprises forming the function $f_2$ in the overlapping region as follows:

$$f_2 = (\alpha * S_1 + \beta * S_2)/(\alpha + \beta)$$

with coefficient factors:

$$\alpha = (N_2 - S_2)/(N_2 - N_1) \text{ and } \beta = (S_1 - N_1)/(N_2 - N_1).$$

5. The method according to claim 2, which comprises equating the wide-range signal W to the second measurement signal $S_2$ for values of the second measurement signal $S_2$ to which a neutron flux density greater than the upper limit value is allocated.

6. The method according to claim 2, which comprises determining a further overlapping region immediately adjacent the first-mentioned overlapping region in an analogous manner to the formation of the first-mentioned overlapping region, by using the second measurement signal $S_2$ and a third measurement signal dependent on the neutron flux density and differing from the first measurement signal $S_1$ and the second measurement signal $S_2$.

7. The method according to claim 1, which comprises determining the wide-range signal W as a monotonally rising function of the neutron flux density.

8. The method according to claim 1, which comprises using a measurement signal of one of an ionization chamber, a fission chamber, a boron meter, an SPN detector and a counting tube in each case for the measurement signals $S_1$, $S_2$.

9. The method according to claim 1, which comprises using a pulsed signal from an ionization chamber as the first measurement signal $S_1$, and using a direct-current or alternating-current signal from the ionization chamber as the second measurement signal $S_2$.

10. The method according to claim 1, which comprises determining the neutron flux density in a nuclear power facility having a reactor core with a plurality of fuel assemblies as the neutron-emitting source, and determining the neutron flux density between the fuel assemblies.

11. The method according to claim 1, which comprises determining the neutron flux density in a nuclear power facility having a reactor core with a plurality of fuel assemblies as the neutron-emitting source, and determining the neutron flux density outside the reactor core.

12. The method according to claim 1, which comprises determining the neutron flux density in a nuclear power facility having a reactor core with a plurality of fuel assemblies as the neutron-emitting source, and determining the neutron flux density between the fuel assemblies and outside the reactor core.

13. An apparatus for determining the neutron flux density of a neutron-emitting source, comprising:

a measurement device for producing and transmitting a first measurement signal $S_1$ and a second measurement signal $S_2$ differing from one another and each dependent on a neutron flux density, the first measurement signal $S_1$ being a monotonal function of the neutron flux density for values of the neutron flux density less than a first limit flux density; and an evaluation device to be connected to said measurement device for forming a wide-range signal W depending uniquely on the neutron flux density and used to determine the neutron flux density, wherein:

a) said wide-range signal W corresponds to the first measurement signal $S_1$ in accordance with the relationship $W=f_1(S_1)=S_1$ when the first measurement signal $S_1$ assumes values corresponding to a neutron flux density of less than a lower limit value which is less than the first limit flux density and to which a first signal value $N_1$ of the first measurement signal $S_1$ is allocated;

b) said wide-range signal W is a function $f_2$ of the measurement signals $S_1$ and $S_2$ in accordance with the relationship $W=f_2(S_1,S_2)$ when the first measurement signal $S_1$ assumes values corresponding to a neutron flux density greater than the lower limit value; and c) said wide-range signal W is continuous at the lower limit value in accordance with the relationship $f_1(N_1)=f_2(N_1, S_2)$.

* * * * *

UNITED STATES PATENT AND TRADEMARK OFFICE
CERTIFICATE OF CORRECTION

PATENT NO : 5,956,380
DATED : September 21, 1999
INVENTOR(S) : Peter Kiel et al.

It is certified that error appears in the above-identified patent and that said Letters Patent is hereby corrected as shown below:

On title page,

Item [63] should read as follows:

Continuation of PCT/EP96/05656, December 16, 1996.

Signed and Sealed this

Sixteenth Day of May, 2000

Attest:

Q. TODD DICKINSON

Attesting Officer                    Director of Patents and Trademarks